United States Patent [19]

Okada et al.

[11] 4,454,537
[45] Jun. 12, 1984

[54] METHOD FOR REPRODUCING A COLOR PICTURE FOR USE IN A PICTURE REPRODUCING MACHINE

[75] Inventors: Fumio Okada, Kashiwabara; Shunji Hirobe; Masayuki Yamaguchi, both of Kyoto, all of Japan

[73] Assignee: Dainippon Screen Seizo Kabushiki Kaisha, Kyoto, Japan

[21] Appl. No.: 353,248

[22] Filed: Mar. 1, 1982

[30] Foreign Application Priority Data

Apr. 7, 1981 [JP] Japan .................................. 56-51248

[51] Int. Cl.³ .......................... H04N 1/46; H04N 1/26
[52] U.S. Cl. .......................................... 358/77; 358/78; 358/287
[58] Field of Search ....................... 358/77, 75, 76, 78, 358/262, 287, 288, 313, 321

[56] References Cited

U.S. PATENT DOCUMENTS

| | | | |
|---|---|---|---|
| 3,956,583 | 5/1976 | Pugsley | 358/78 |
| 3,975,761 | 8/1976 | Taudt | 358/78 |
| 4,163,605 | 8/1979 | Yamada | 358/77 |
| 4,270,141 | 5/1981 | Sakamoto | 358/78 |
| 4,293,872 | 10/1981 | Keller | 358/78 |
| 4,350,997 | 9/1982 | Yamada | 358/77 |

*Primary Examiner*—Tommy P. Chin
*Attorney, Agent, or Firm*—Daniel M. Rosen

[57] ABSTRACT

A method for reproducing a color picture for use in a picture reproducing machine in which picture and recording cylinders are rotated at a certain rotation speed ratio, and pickup and exposure heads are moved in the direction of the cylinders' axis at a certain moving speed ratio, and in which picture signals picked up by scanning an original picture mounted to the picture cylinder are first stored in a memory and then are consecutively read out of the memory in synchronization with the rotation of the recording cylinder. Recording signals are composed from one scanning period of picture signals and the following scanning period of picture signals when the one scanning period of picture signals stored in the memory are skipped, and then thus obtained recording signals are fed to the exposure head.

6 Claims, 8 Drawing Figures

F I G. 7
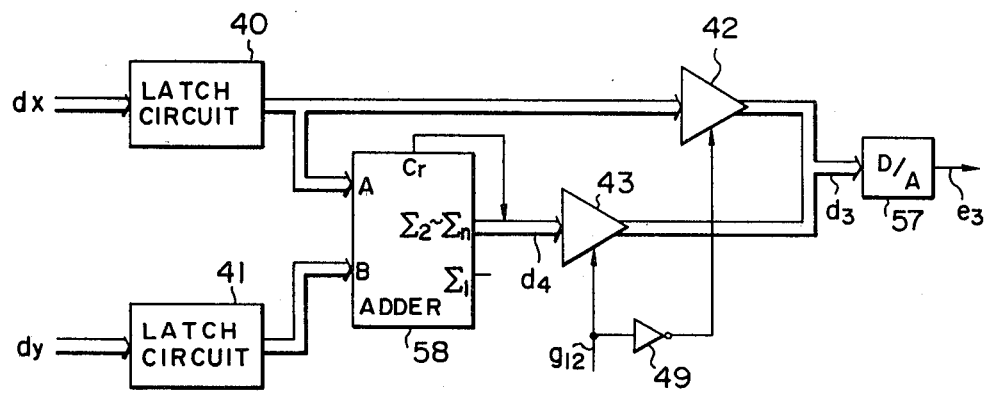
F I G. 8
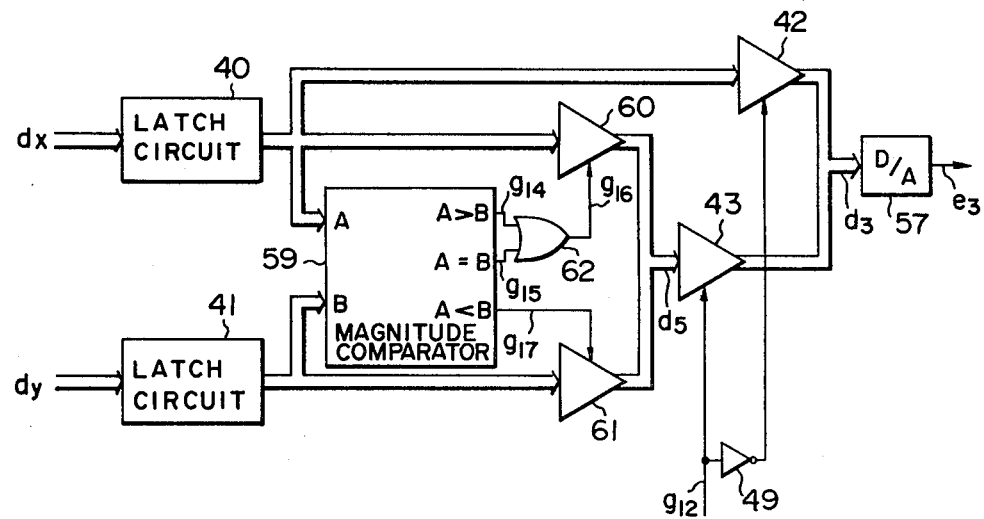

METHOD FOR REPRODUCING A COLOR PICTURE FOR USE IN A PICTURE REPRODUCING MACHINE

BACKGROUND OF THE INVENTION

The present invention relates to a method for reproducing a color picture of high quality with a variable reproduction scale, for use in a picture reproducing machine of a cylinder type such as a color scanner for plate making and a color facsimile.

In a conventional color scanner of a cylinder type, some methods for varying a reproduction scale have been proposed. One of these methods is patented in Japan with the patent No. 1010876 (Patent Publication No. 52-18601), and, when this method is brought into effect, the present invention is applied. This conventional method will be described briefly in the followings.

In the conventional color scanner of a cylinder type, a picture cylinder on which an original picture is mounted, and a recording cylinder on which a photosensitive film is mounted, are synchronously rotated, and the original picture and the photosensitive film are scanned by a pickup head and a recording head which are moved in the direction of the cylinders' axes. Picture signals picked up by the pickup head are usually processed in a color separation step, a color correction step, a tone control step, and so forth, and thus the obtained recording signals are sent to the recording head and control the brightness of an exposure light source, thereby recording a reproduction picture on the photosensitive film.

In this embodiment, in order to obtain a reproduction picture having a different scale from the original picture, the ratios between the rotation speeds of the picture cylinder and the recording cylinder and the moving speeds of the pickup head and the recording head are set up to the desired values depending on the desired reproduction scale.

In this case, if the picture signals picked up by the pickup head are directly input to the recording section, since the rotation speeds of the two cylinders are different, i.e. the phases of both the sides are shifted each other, the recording position for each scanning period becomes disorder, with the result that a faithful or correct reproduction picture cannot be obtained. In order to remove this defect, the picture signals are first stored in a memory, and then they are read out of the memory in synchronization with the rotation phase of the recording cylinder in their timings, thereby recording a reproduction picture of the desired reproduction scale faithfully.

This method has been effectively practiced. However, when the reproduction scale is reduced, one scanning period of picture signals are not fed from the memory to the recording section, and hence the reproduction picture pattern is discontinuous in the skipped parts, which means the deterioration of the picture quality.

For example, when the reproduction scale is 80% or 4/5 the rotation ratio of the picture and the recording cylinders is set up to 5:4, and thus, while the picture cylinder is rotated five times, the recording cylinder is rotated four times. One scanning line of picture signals are stored in the memory every one rotation of the picture cylinder, whereas one scanning line of picture signals are read out of the memory every one rotation of the recording cylinder. Consequently, the four times of readings are carried out every five times of writings. In other words, 4/5 of the entire picture signals picked up by the pickup head are utilized for the recording.

In this embodiment, however, since the size of the reproduction picture is reduced to 80% of the original while 20% of the picture signals are skipped, the signal amount per one area unit is not changed, and, commonly, the distinguished deterioration of the picture quality is not felt. But, the defect is put in an appearance depending on kinds of the pictures.

For instance, when an oblique line of a certain angle with respect to the scanning direction exists in the picture, a pattern to be recorded in a natural shape by continuous smooth lines is recorded somewhat in a deformed shape by stepwise discontinuous lines because the parts skipped are not recorded. Particularly, since such a discontinuity occurs every certain pitches of the scanning lines, depending on reproduction scales the reproduction picture gives an unnatural impression, and the quality of the reproduction picture is conspicuously deteriorated. (For example, when the reproduction scale is 80%, the discontinuity occurs every five scanning lines.)

SUMMARY OF THE INVENTION

It is an object of the present invention to provide a method for reproducing a color picture of high quality with a variable reproduction scale for use in a picture reproducing machine of a cylinder type such as a color scanner for plate making and a color facsimile free from the aforementioned defects, which reduces largely the discontinuities due to the skip of the signals depending on the reproduction scales, and removes interference fringes formed by the halftone screen and the skipped parts.

According to the present invention there is provided a method for reproducing a color picture for use in a picture reproducing machine wherein picture and recording cylinders are rotated at a certain rotation speed ratio, and pickup and exposure heads are moved at a certain moving speed ratio in the direction of the cylinders' axis, and wherein picture signals picked up by scanning an original picture mounted to the picture cylinder are first stored in a memory and then are consecutively read out of the memory in synchronization with the rotation of the recording cylinder, the improvement which comprises the step of composing recording signals from the first scanning period of picture signals and the second scanning period of picture signals when the first scanning period of picture signals stored in the memory are skipped, thereby outputting the obtained recording signals to the exposure head.

BRIEF DESCRIPTION OF DRAWINGS

In order that the present invention may be better understood, preferred embodiments thereof will be described with reference to the accompanying drawings, in which:

FIG. 7 is a block diagram of one embodiment of picture signal composing means by an arithmetic mean calculation; and FIG. 8 is a block diagram of one embodiment of picture signal composing means by an characteristic part selection.

DESCRIPTION OF THE PREFERRED EMBODIMENTS

Figure 1:
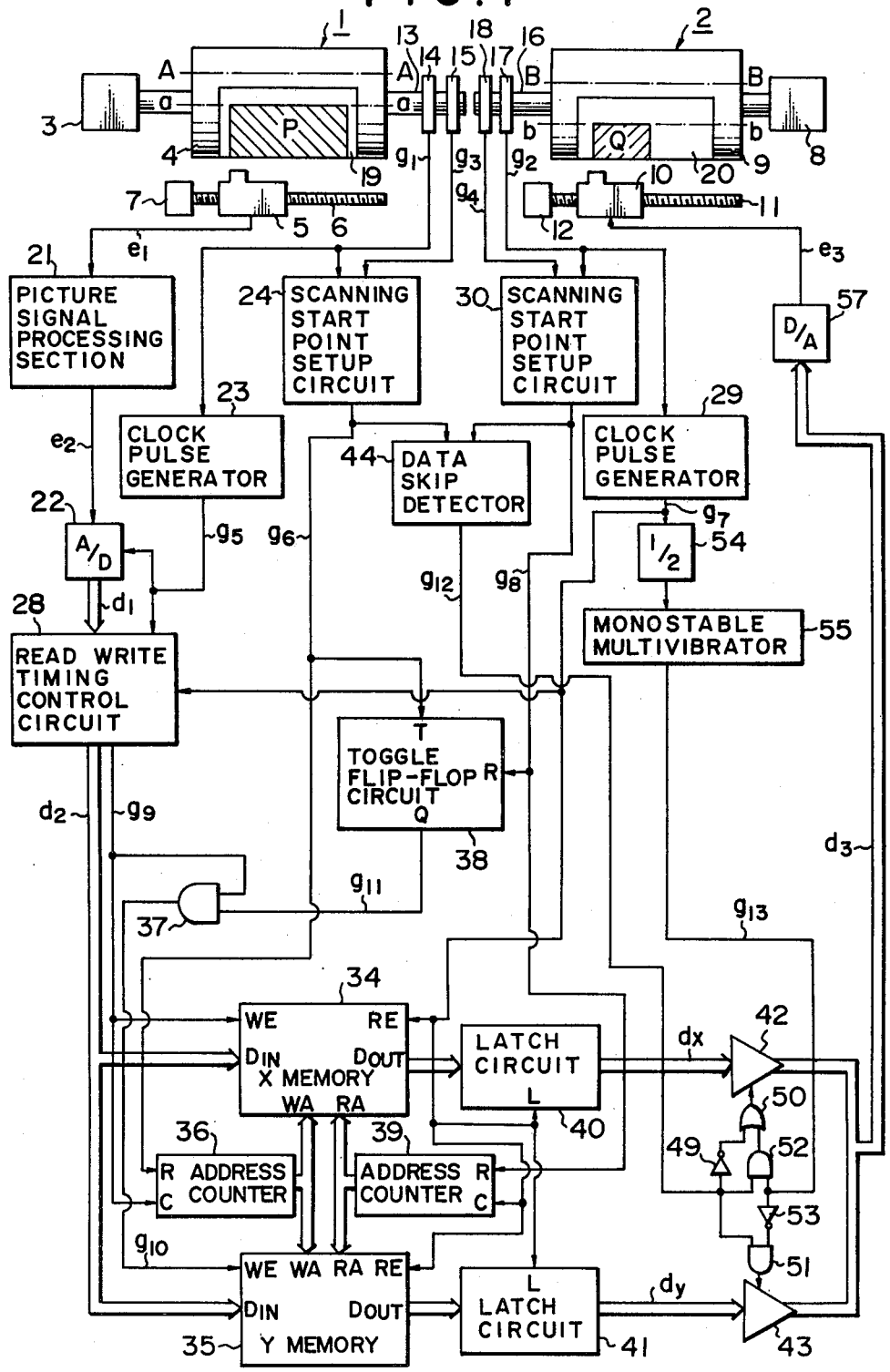
FIG. 1 is a block diagram of a picture reproducing machine for carrying out a method according to the present invention.

Referring to the drawings there is shown in FIG. 1 a picture reproducing machine which performs a method according to the present invention, and which comprises a picture scanning section 1 and an exposure scanning section 2.

The picture scanning section 1 comprises a picture cylinder 4 which is driven by a motor 3, and a pickup head 5 which is moved on and along a screw rod 6 by a motor 7 in the direction of the cylinder's axis. The exposure scanning section 2 comprises a recording cylinder 9 which is driven by a motor 8, and an exposure head 10 which is moved on and along a screw rod 11 by a motor 12 in the direction of the cylinder's axis.

The rotation speed or phase and the rotation period of the picture cylinder 4 are detected by a rotary encoder 14 and a one-rotation rotary encoder 15, respectively, which are coaxially mounted to a rotary shaft 13 of the picture cylinder 4, and output timing pulses $g_1$ and $g_3$. The rotation speed or phase and the rotation period of the recording cylinder 9 are detected by a rotary encoder 17 and a one-rotation rotary encoder 18, respectively, which are coaxially mounted to a rotary shaft 16 of the recording cylinder 9, and output timing pulses $g_2$ and $g_4$. The encoders 15 and 18 output one rotation pulse at the predetermined standard positions A—A and B—B.

The pickup head including a photoelectric converter of a conventional type scans a scanning part P of an original picture 19 mounted to the picture cylinder 4 and outputs an analog picture signal $e_1$ corresponding to the density of the scanning part P.

The exposure head 10 having a light beam modulation means of a conventional type is controlled by an analog recording signal $e_3$ and records a reproduction picture Q on a photosensitive film 20 mounted to the recording cylinder 9.

In the picture scanning section 1 and the exposure scanning section 2, the rotation speed ratio between the picture and the recording cylinders 4 and 9 is determined. For example, when the reproduction scale M reduced is ½, if the rotation speed of the picture cylinder 4 is N r.p.m., the rotation speed of the recording cylinder 9 becomes ½ N r.p.m.

The moving speed ratio between the pickup and the exposure heads 5 and 10 is determined depending on a reproduction scale M. For example, when the reproduction scale M reduced is ½, the recording head 10 is moved at the half speed of that of the pickup head 5.

The analog picture signal $e_1$ output from the pickup head 5 is sent to a picture signal processing section 21, and the necessary and the desired processings for the reproduction are carried out there. When the reproduction picture is to be obtained as a color separation plate, the necessary analog arithmetic processings for obtaining the color separation plates and the print finish such as a masking, a tone control, a color correction, and so forth, are performed in the picture signal processing section 21, and thus the processed signal $e_2$ is output therefrom to an analog-digital converter 22, hereinafter referred to as an A/D converter. In the A/D converter 22, the signal $e_2$ is converted into a digital picture signal $d_1$ having a bit number of the desired resolving power.

Meanwhile, the timing pulse $g_1$ generated by the rotary encoder 14 is fed to a clock pulse generator 23 and a scanning start point setup circuit 24. The clock pulse generator 23 outputs a clock pulse $g_5$ for sampling the analog picture signal $e_2$ to the A/D converter 22. The one-rotation pulse $g_3$ generated by the one-rotation rotary encoder 15 is sent to the scanning start point setup circuit 24 which outputs a start pulse $g_6$ having the same pulse width as the clock pulse $g_5$ at a scanning start standard line a—a of the scanning part P of the original picture 19.

Figure 2:
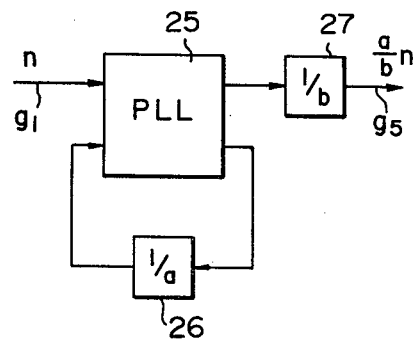
FIG. 2 is a block diagram of one embodiment of a clock pulse generator of a picture scanning section shown in FIG. 1.

The clock pulse generator 23 comprises a phase-lock loop circuit 25, a 1/a divider 26 connected thereto, and a 1/b divider 27 which is connected to the output of the phase-lock loop circuit 25 and removes jitter, and converts a pulse number n of the timing pulses $g_1$ input into another pulse number (a/b)n by multiplying a/b, thereby outputting the clock pulses $g_5$, as shown in FIG. 2.

In this case, the pulse number (a/b)n of the clock pulse $g_5$ is determined depending on a sampling pitch having a resolving power required to the A/D conversion in the direction of the time axis, and the value a is far larger than the value b.

The clock pulse $g_5$ is sent to the A/D converter 22 in which the analog signal $e_2$ is converted into the digital picture signal $d_1$ at a sampling pitch corresponding to the pulse number (a/b)n. The digital picture signal $d_1$ is sent to a read-write timing control circuit 28.

On the other hand, the timing pulse $g_2$ generated by the rotary encoder 16 is sent to a clock pulse generator 29 and a scanning start point setup circuit 30. In the clock pulse generator 29 the timing pulse $g_2$ is converted into a reading pulse $g_7$. The one-rotation pulse $g_4$ generated by the one-rotation rotary encoder 18 is sent to the scanning start point setup circuit 30 together with the timing pulse $g_2$, and the scanning start point setup circuit 30 outputs a start pulse $g_8$ having the same pulse width as the clock pulse $g_7$ at a scanning start standard line b—b of the reproduction picture Q of the photosensitive film 20.

Figure 3:
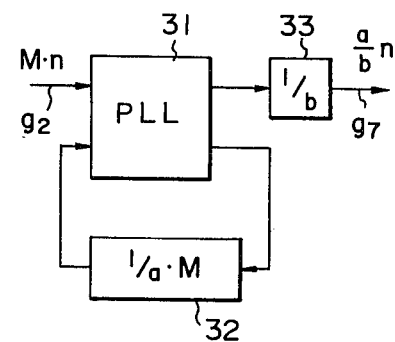
FIG. 3 is a block diagram of one embodiment of a clock pulse generator of an exposure scanning section shown in FIG. 1.

The clock pulse generator 29 comprises a phase-lock loop circuit 31, a presetable (1/a)M divider 32 connected thereto, and a 1/b divider 33 which is connected to the output of the phase-lock loop circuit 31 and removes the jitter, the divider 32 presetting a value M/a obtained by multiplying the reproduction scale M to the dividing rate 1/a, as shown in FIG. 3.

The clock pulse generator 29 receives the timing pulse $g_2$ having the pulse number M.n (the pulse number n of the timing pulse $g_1$ multiplied by the reproduction scale M), and outputs the reading pulses $g_7$ of the same pulse number (a/b)n as that of the clock pulses $g_5$.

The clock pulse $g_5$ and the reading pulse $g_7$ are sent to the read-write timing control circuit 28 in which the reading pulse $g_7$ has precedence over the clock pulse $g_5$, and the read-write timing control circuit 28 outputs a writing pulse $g_9$ and a digital picture signal $d_2$ timed to the writing pulse $g_9$ to data input terminals $D_{in}$ of a X-memory 34 and a Y-memory 35.

The writing pulse $g_9$ is sent to a write enabling terminal WE of the X-memory 34 and a clock input terminal C of an address counter 36 which controls writing address terminals WA of the X-memory 34 and the Y-memory 35. The start pulse $g_6$ generated by the scanning start point setup circuit 24 is sent to a reset terminal R of the address counter 36.

The writing pulse $g_9$ is also fed to one input terminal of an AND gate 37, and an output signal of the AND gate 37 is input to a write enabling terminal WE of the Y-memory 35 as a writing pulse $g_{10}$ therefor.

The scanning start point setup circuit 24 sends the start pulse $g_6$ to a toggle terminal T of a toggle flip-flop circuit 38, and the scanning start point setup circuit 30 sends the start pulse $g_8$ to a reset terminal F of the toggle flip-flop circuit 38 which outputs a signal $g_{11}$ to the other input terminal of the AND gate 37.

When the toggle flip-flop circuit 38 is reset by the start pulse $g_8$, the output signal $g_{11}$ of this flip-flop circuit 38 becomes the high level "H", thereby opening the AND gate 37. On the other hand, the start pulse $g_6$ inverts alternately the level of the output signal $g_{11}$ of the toggle flip-flop circuit 38.

The reading pulse $g_7$ generated by the clock pulse generator 29 is sent to read enabling terminals RE of the X-memory 34 and the Y-memory 35 and a clock input terminal C of an address counter 39 which controls reading address terminals RA of the X-memory 34 and the Y-memory 35. The start pulse $g_8$ generated by the scanning start point setup circuit 30 is sent to a reset terminal R of the address counter 39.

The reading pulse $g_7$ is also fed to latch terminals L of latch circuits 40 and 41 which once latch data dx and dy output from the X-memory 34 and the Y-memory 35 when they once finish the reading of the data, and which send the latched data dx and dy to on-off switches 42 and 43 until they latch the following data.

The address counters 36 and 39 are reset to their first addresses by the start pulses $g_6$ and $g_8$ fed to the reset terminals R thereof, thereby substantially determining the scanning start points a—a and b—b for the picture and the exposure scanning sections. Further, the start pulses $g_6$ and $g_8$ are sent to a data skip detector 44 which outputs a data skip signal $g_{12}$ for performing the on-off controls of the on-off switches 42 and 43.

Figure 4:
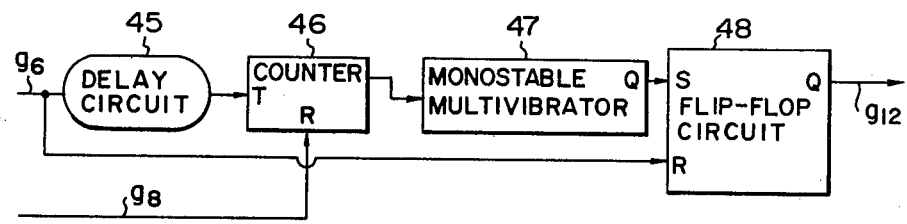
FIG. 4 is a block diagram of one embodiment of a data skip detector shown in FIG. 1.

The data skip detector 44 comprises a delay circuit 45, a counter 46, a monostable multivibrator 47, and a flip-flop circuit 48 which are connected in series, as shown in FIG. 4. The start pulse $g_6$ is fed to the delay circuit 45 which somewhat delays the leading edge of the start pulse $g_6$ and outputs the delayed pulse to the counter 46. The counter 46 counts up the delayed pulses input from the delay circuit 45 and outputs a signal every two delayed pulses to the monostable multivibrator 47 which outputs a pulse having a narrow pulse width. The output signal of the monostable multivibrator 47 is fed to a set terminal S of the flip-flop circuit 48, and then the flip-flop circuit 48 raises its output signal, i.e. the data skip signal $g_{12}$ to the high level "H".

The start pulse $g_8$ is fed from the scanning start point setup circuit 30 to a reset terminal R of the counter 46 so as to reset it. Accordingly, the counter 46 raises its output signal to the high level "H" only when the two start pulses $g_6$ are included in one period of the start pulses $g_8$, thereby setting the flip-flop circuit 48.

The flip-flop circuit 48 is reset by the start pulse $g_6$. Hence, when the counter 46 counts two delayed start pulses $g_6$ soon after the reset of the flip-flop circuit 48, it is set and maintains the set state in approximately one period of the start pulses $g_6$.

When two start pulses $g_6$ of the original picture part are output in one period of the start pulses $g_8$ of the recording part, the picture signals in the scanning period of the first of these start pulses $g_6$ are unnecessary. In the prior art, these unnecessary picture signals are skipped, and only the picture signals in the scanning period of the second start pulse $g_6$ are used for recording.

The flip-flop circuit 48 of the data skip detector 44 outputs the data skip signal $g_{12}$ of the high level "H" when the one scanning period of picture signals are skipped, or the scanning period of the first start pulse $g_6$ is discriminate from the scanning period of the second start pulse $g_6$, for instance, the counter 46 counts two, resulting in skipping the picture signals. The data skip signal $g_{12}$ selectively controls the on-off switches 42 and 43.

For example, the on-off switch 42 for the X-memory 34 is controlled by the data skip signal $g_{12}$ via an inverter 49 and one input terminal of an OR gate 50, and the on-off switch 43 is controlled by the data skip signal $g_{12}$ via one input terminal of an AND gate 51.

Accordingly, when the counter 46 counts one, the on-off switch 42 opens the bus line, and, when the counter 46 counts two, the AND gate 51 is opened, with the result of the condition of which the bus line of the on-off switch 43 can be opened by the data skip signal $g_{12}$.

Further, when the counter 46 counts two, an AND gate 52 connected to the other input terminal of the OR gate 50 for the on-off switch 42 is opened by the data skip signal $g_{12}$ fed to one input terminal of the AND gate 52 itself, thereby obtaining the condition that the bus line of the on-off switch 42 can be opened by the data skip signal $g_{12}$.

An on-off control signal $g_{13}$ is sent to the other input terminals of the AND gates 52 and 51 directly and via an inverter 53 as reversed polarities each other. The on-off control signal $g_{13}$ is prepared by a ½ divider 54 and a monostable multivibrator 55 connected thereto on the basis of the reading pulse $g_7$ and is output from the monostable multivibrator 55. The on-off control signal $g_{13}$ is a pulse signal having the half period as long as the reading pulse $g_7$ and a duty cycle of 50%.

Figure 5:
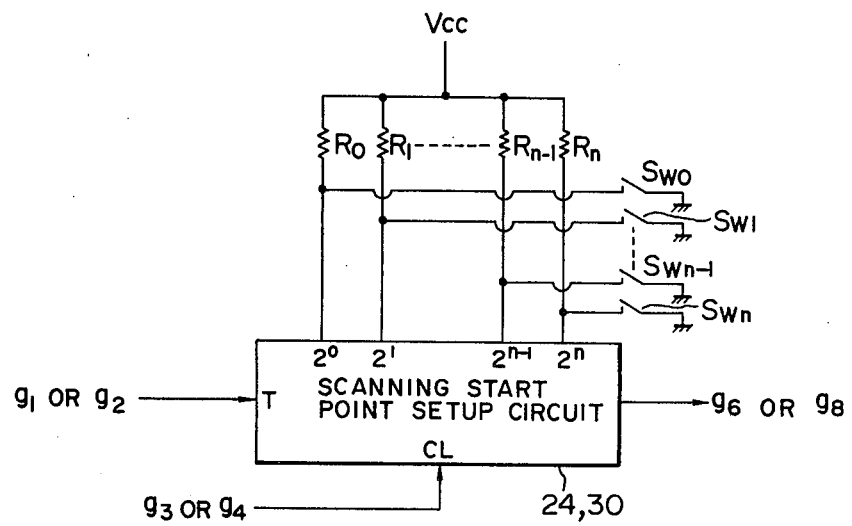
FIG. 5 shows one embodiment of a scanning start point setup circuit of FIG. 1.

In FIG. 5 there is shown one embodiment of the scanning start point setup circuit 24 or 30 comprising a preset counter 56, which sets up the distance between the standard position A—A or B—B and the scanning start standard line a—a or b—b for the original picture or the photosensitive film.

The timing pulse $g_1$ or $g_2$ and the one-rotation pulse $g_3$ or $g_4$ are input to a count pulse input terminal T and a clear terminal CL of the present counter 56. A plurality of pull-up resistors $R_O$-$R_n$ and preset switches $S_{wO}$-$S_{wn}$ are connected to preset value input terminals $2^O$-$2^n$ of the preset counter 56, which correspond to figures of binary coded preset values.

In the preset switches $S_{wO}$-$S_{wn}$, binary codes representing distances or rotation phases between the standard positions A—A or B—B and the scanning start standard lines a—a or b—b, calculated by timing pulse numbers, are set up.

The preset counter 56 starts to count the timing pulses $g_1$ from when it is cleared by the one-rotation pulse $g_3$. Then, the preset counter 56 outputs the start pulse $g_6$ when it counts the count number corresponding to the preset distance.

Figure 6:
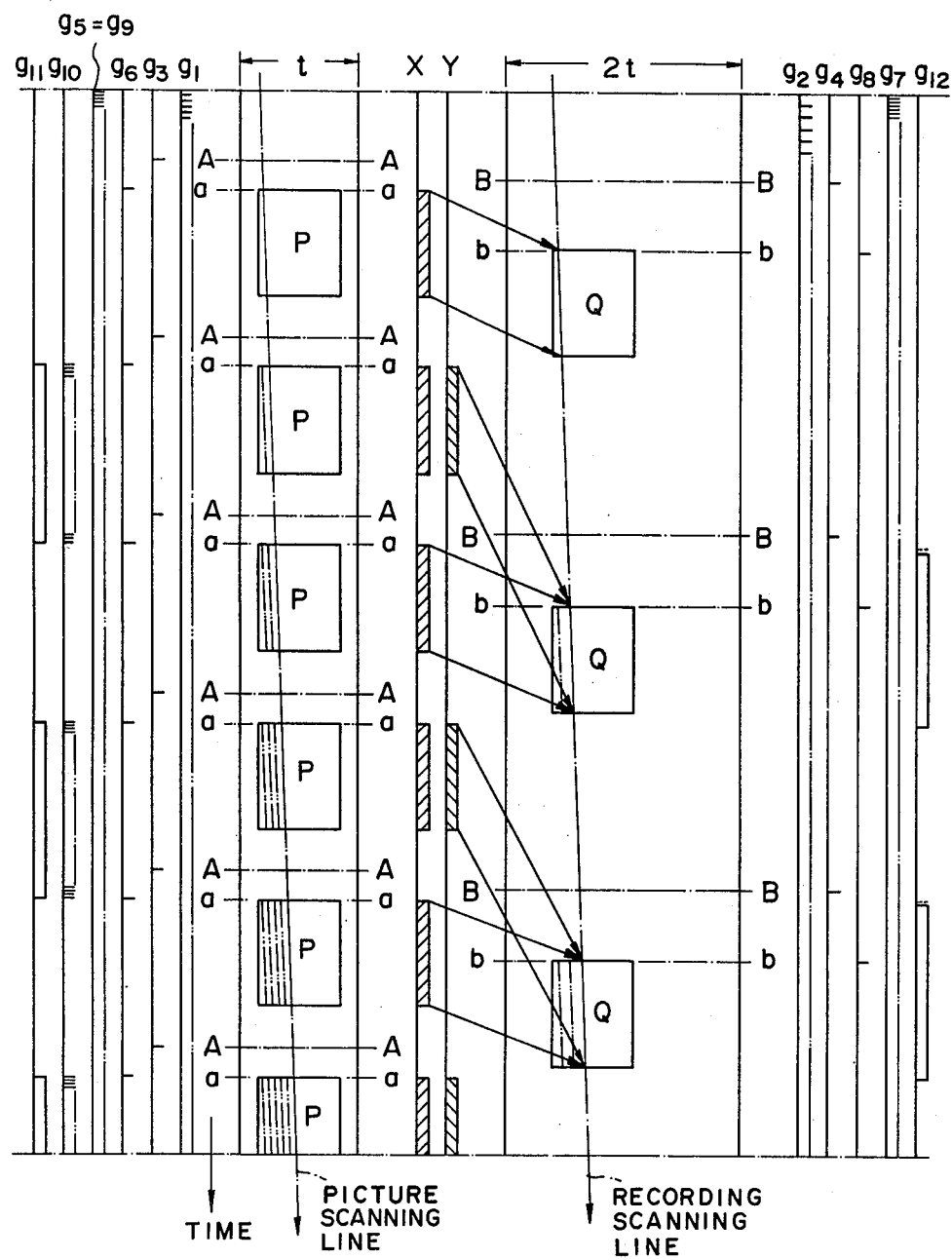
FIG. 6 shows a time chart of pulses and signals shown in FIG. 1.

In FIG. 6 there is shown a time chart of the pulses and the signals used in the picture reproducing machine described above. The operation of the members of the picture reproducing machine will be described in connection with this time chart.

The X-memory 34 stores consecutively the picture signals $d_2$ in the address order by the writing pulse $g_9$, with the synchronization of the first address with the start pulse $g_6$.

In this embodiment, the writing pulse $g_9$ is regarded as the clock pulse $g_5$ as long as the clock pulse $g_5$ does not overlap to the reading pulse $g_7$, and hence the clock pulse $g_5$ and the writing pulse $g_9$ can be considered as the same.

The picture signals $d_2$ stored in the X-memory 34 are rewritten by those of the start pulse $g_6$ every time the start pulse $g_6$ is output.

The writing of the picture signals $d_2$ into the Y-memory 35 is enabled by the writing pulse $g_{10}$ obtained by passing the writing pulse $g_9$ through the AND gate 37. On this occasion, the writing addresses of the Y-memory 35 are addressed in the same address order as those of the X-memory 34. Therefore, the Y-memory 35 stores the picture signals $d_2$ in parallel with the X-memory 34 only when the writing pulse $g_9$ is output.

The AND gate 37 is so controlled by the output signal $g_{11}$ of the toggle flip-flop circuit 38 that the AND gate 37 may be opened to pass the writing pulse $g_9$ therethrough when the output signal $g_{11}$ is changed to the high level "H" by the start pulse $g_6$ input secondarily to the toggle terminal T of the toggle flip-flop circuit 38 after the toggle flip-flop circuit 38 is reset by the start pulse $g_8$.

The reading of the data dx and dy out of the X-memory 34 and the Y-memory 35 is enabled, in common, by the reading pulse $g_7$. The address counter 39 is reset by the start pulse $g_g$, and thereby the first addresses of the X-memory 34 and the Y-memory 35 are addressed. Then, their addresses are consecutively advanced, thereby reading out the data dx and dy. The data dx and dy read out of the X-memory 34 and the Y-memory 35 are latched in the latch circuits 40 and 41 by the trailing edge of the high level of the reading pulse $g_7$.

While the counter 46 of the data skip detector 44 counts one, only the on-off switch 42 opens its bus line by means of the data skip signal $g_{12}$ having the low level "L", which is generated by the data skip detector 44, thereby passing the data dx sent from the latch circuit 40 to a digital-analog converter 57, hereinafter referred to as a D/A converter.

When the toggle flip-flop circuit 38 is triggered by the start pulses $g_6$ during the reset period, the picture signals are written in the Y-memory 35, as described above, and thereafter the counter 46 of the data skip detector 44 counts two, to output the data skip signal $g_{12}$ having the high level "H". This data skip signal $g_{12}$ opens the AND gates 52 and 53 for the on-off switches 42 and 43, so that the AND gates 52 and 53 may pass the on-off control signal $g_{13}$.

Since the on-off control signal $g_{13}$ is the pulse having the half period as long as the reading pulse $g_7$ and the duty cycle of 50% and is synchronous with the reading pulse $g_7$, as described above, the on-off switches 42 and 43 are alternately opened every period of the reading pulse $g_7$.

Hence, when the counter 46 of the data skip detector 44 counts two, that is, the one scanning period of picture signals are skipped, the one scanning period of picture signals $d_2$ stored previously in the Y-memory 35 and the next scanning scanning period of picture signals $d_2$ stored in the X-memory 34 are alternately read out as digital recording signals $d_3$ to the D/A converter 57 through the on-off switches 42 and 43 every period of the reading pulse $g_7$. Then, the digital reading signals $d_3$ are converted into the analog recording signals $e_3$ in the D/A converter 57, and the analog recording signals $e_3$ are sent to the exposure head 10 and control its exposure light, thereby recording the desired reproduction picture on the photosensitive film 20.

From the above description, it is readily understood that, when the one scanning period of picture signals is skipped, the discontinuity of the reproduction picture is inconspicuously improved by alternately aligning the one scanning and the following scanning periods of picture signals in one recording scanning line.

The alternate alignment of the data dx and dy read out of the X-memory 34 and the Y-memory 35 in one recording scanning line can be carried out by the other methods.

For example, the lowermost bit of the address counter 39 is used instead of the on-off control signal $g_{13}$ in order to control the on-off switches 42 and 43 in the same manner as the first embodiment described above.

Further, the reading pulse $g_7$ can be directly fed to the monostable multivibrator 55 not via the ½ divider 54, and the monostable multivibrator 55 outputs a pulse having a duty cycle of 50% which is used instead of the on-off control signal $g_{13}$ in order to control the on-off switches 42 and 43 in the similar manner to the first embodiment. In this embodiment, the data dx and dy read out of the memories 34 and 35 are alternately aligned during the period of the reading pulse $g_7$ to obtain the recording signal $d_3$.

In the latter case, the two picture signals for the two adjacent picture scanning lines are composed into one recording signal for one recording scanning line, and accordingly the sampling pitch of this composing portion is twice finer as wide as that of the picture scanning lines, which improves the picture quality of the discontinuous part as compared with the above two embodiments.

Further, when the two picture signals for the two picture scanning lines are composed into one recording signal for the one recording scanning line, the discontinuity of the reproduction picture is unobtrusively improved by an arithmetic mean, calculation means or a characteristic part selection means, as shown in FIGS. 7 and 8.

In FIGS. 7 and 8, the latch circuits 40 and 41, on-off switches 42 and 43, the inverter 49, and the D/A converter 57 have the same constructions and functions as those of FIG. 1, and thus the time chart of their operations is the same as that shown in FIG. 6.

In FIG. 7, the output data dx and dy of the memories 34 and 35 are fed to input terminals A and B of an adder 58 through the latch circuits 40 and 41 in order to perform an arithmetic mean calculation. The adder 58 omits the lowermost bit ($\Sigma_1$ terminal) of an added value and arranges a carry signal (Cr terminal) to its uppermost bit, thereby outputting an arithmetic mean signal $d_4$ to the on-off switch 43 which is opened by the data skip signal $g_{12}$ having the high level "H".

The output data dx of the X-memory 34 is sent to the on-off switch 42 through the latch circuit 40, the on-off switch 42 being opened by the data skip signal $g_{12}$ having the low level "L" which is fed thereto via an inverter 49. To the D/A converter 57, when no picture signal is skipped, the output data dx of the X-memory 34 is sent, and when the picture signals are skipped, the arithmetic mean signal $d_4$ is sent as the recording signal $d_3$.

In the embodiment shown in FIG. 8, when the recording signals for one recording scanning line are composed from the picture signals for the two picture scanning lines to be composed, the characteristic part of the picture signals of the two picture scanning lines is selected in the address order in the part existing a distinguished discontinuous density or tone difference in eyesight.

In this embodiment, one having the higher density value is consecutively selected from the output data dx and dy. The output data dx and dy of the two memories 34 and 35 is input to comparation signal input terminals A and B of a magnitude comparator 59 and a pair of on-off switches 60 and 61. The magnitude comparator 59 outputs comparison signals $g_{14}$ and $g_{15}$ to an OR gate 62 when the value on the terminal A is larger than that on the terminal B, and the former equals the latter. The OR gate 62 sends an output signal $g_{16}$ to the on-off switch 60 to perform its on-off control, and thus the on-off switch 60 is opened when the value on the terminal A is at least that on the terminal B in the magnitude comparator 59.

The magnitude comparator 59 also outputs a comparison signal $g_{17}$ to the on-off switch 61 so as to open it when the value on the terminal A is less than that on the terminal B in the magnitude comparator 59.

The output signal of the on-off switch 60 or 61 is sent to the on-off switch 43 as a characteristic part signal $d_5$, which is opened by the data skip signal $g_{12}$ having the high level "H".

The output data dx of the X-memory 34 is sent to the on-off switch 42 through the latch circuit 40, the on-off switch 42 being opened by the data skip signal $g_{12}$ having the low level "L" fed via the inverter 49. When no picture signal is skipped, the output data dx of the X-memory 34 is sent to the D/A converter 57, and when the picture signals are skipped, the characteristic part signal $d_5$ is sent to the same, as the recording signal $d_3$, in the similar manner to the above embodiment.

Although the present invention has been described in some detail by way of illustration and example for purposes of clarity of understanding, it will, of course, be understood that various changes and modifications thereof may be made in the form, details, and arrangements of the parts without departing from the scope of the present invention.

What is claimed is:

1. A method for reproducing a color picture for use in a picture reproducing machine wherein picture and recording cylinders are rotated at a certain rotation speed ratio, and pickup and exposure heads are moved at a certain moving speed ratio in the direction of the cylinders' axis, and wherein picture signals picked up by scanning an original picture mounted to the picture cylinder are first stored in a memory and then are consecutively read out of the memory in synchronization with the rotation of the recording cylinder, the improvement which comprises the step of composing recording signals obtained from a first scanning period of picture signals and a second scanning period of picture signals when said first scanning period of picture signals stored in the memory is skipped, thereby outputting the composed recording signals to the exposure head.

2. A method as defined in claim 1, wherein each scanning period of picture signals is consecutively stored in parallel into two memories, and, when the first scanning period of picture signals is skipped, the first scanning period of picture signals stored in one memory is rewritten by the second period of picture signals while the first scanning period of picture signals stored in the other memory is held, and wherein the first and the second scanning periods of picture signals are then read out of the memories in order to compose the recording signals therefrom.

3. A method as defined in claim 2, wherein the recording signals are composed by alternately reading the first and the second scanning periods of picture signals out of the two memories.

4. A method as defined in claim 2, wherein the recording signals are composed by calculating arithmetic means of the first and the second scanning periods of picture signals read out of the memories in the order of its corresponding address in the respective memory.

5. A method as defined in claim 2, wherein the recording signals are composed by selecting one picture signal having larger or lower density of the first and the second scanning periods of picture signals read out of the memories in the order of its corresponding address in the respective memory.

6. A method as defined in claim 1, wherein the first scanning period of picture signals stored in the memory is rewritten by the second scanning period of picture signals only in odd or even address order when the first scanning period of picture signals is skipped, thereby composing the recording signals.

* * * * *